United States Patent [19]

Langford et al.

[11] Patent Number: 4,467,785
[45] Date of Patent: Aug. 28, 1984

[54] CHEMICAL HEAT STORAGE

[76] Inventors: Cooper A. Langford, 120 Ossington St., Ottawa, Ontario, Canada; John Jones, 16 St. Andrews Cir., Kanata, Ontario, Canada; William D. Riddell, P.O. Box 92, Munster, Ontario, Canada

[21] Appl. No.: 211,808

[22] Filed: Dec. 1, 1980

[51] Int. Cl.³ .................. F24H 7/00; B01D 53/00; F25D 17/06; F28D 1/00
[52] U.S. Cl. .................................... 126/400; 55/33; 62/92; 62/94; 62/271; 165/104.11; 165/10
[58] Field of Search .................. 126/400, 430, 436; 165/104.11 A, 10, DIG. 4; 62/90, 91, 94, 92, 93, 235.1, 271; 55/31, 32, 33

[56] References Cited
U.S. PATENT DOCUMENTS

| | | | |
|---|---|---|---|
| 2,799,362 | 7/1957 | Miller | 55/31 |
| 4,061,267 | 12/1977 | Lof | 126/427 |
| 4,227,375 | 10/1980 | Tompkins | 165/4 |
| 4,240,404 | 12/1980 | Franchina | 126/427 |

Primary Examiner—Samuel Scott
Assistant Examiner—G. Anderson
Attorney, Agent, or Firm—Birch, Stewart, Kolasch & Birch

[57] ABSTRACT

The present invention uses a dessicant and a means of drying out or changing the system by the use of off-peak electric power releasing. The heat is then released as required during periods of peak electric power by the reintroduction of moisture. The system includes a source of air and a fan for circulating the air in a circulation system including an outgoing loop and return loop for the circulating air. Selectively operatable evaporator heat exchanger, air wetting apparatus, and air heating apparatus are disposed in the outgoing loop of the circulating air. A dessicant-containing enclosure used to provide heat storage, and having air inlet means thereinto from outgoing loop the circulating and an air outlet means therefrom to the return loop of the circulating air is disposed in the circulation system. The structure within the enclosure is such that there is a flow of air through a direct, unencumbered path out of contact with a major amount of the dessicant and by a secondary permeating flow through is dessicant. Selectively operable condenser heat exchanger apparatus is disposed in the return loop of the circulating air. Finally, selectively operatable air vanes are disposed in the return loop of the circulating air for (i) circulating air through, e.g. the force air furnace; or (ii) recirculating air through the circulating system.

33 Claims, 4 Drawing Figures

CHEMICAL HEAT STORAGE

BACKGROUND OF THE INVENTION (i) Field of the Invention

This invention relates to a method of, and system for, storing heat. Primarily, it is directed to the storage of heat produced by off-peak electrical power. It is adaptable, however to store heat produced by other means.

(ii) Description of the Prior Art

Various methods and systems have been proposed for the storage of heat and consequently heat storage of itself is not new. It has been suggested that gravel, rocks, concrete, soapstone, and even blocks of steel and the like be heated to a high temperature and that the heat content of the material be thereafter used while the temperature of the heat absorbing means goes down. Such devices of the prior art, however, are limited in their applicability by the fact that the only heat stored is sensible heat, which is a function of the specific heat of the material used. Since the specific heat of available materials is low, usually in the neighbourhood of 0.2 B.T.U. per pound, the heat storage capacity of such material between, for example 200° and 500° F., is only 60 B.T.U. per pound. This renders such heat storing means impractical for space heating purposes because of the large bulk necessary to provide storage for large amounts of heat and because of the need to minimize heat loss from the heat storage means by insulation.

More practical heat storage systems have been devised in which heat of solution or heat of fusion, or a combination of both, are utilized. In such system, a crystalline material having a large amount of water of crystallization may be used, the material being so applied and selected that, upon being heated, the solid material melts or dissolves in its own water of crystallization, with the resulting storage of relatively large quantities of heat in the form of latent heat of fusion and solution. The heat so stored can be recovered by permitting the material to recrystallize.

U.S. Pat. No. 2,450,983 issued Oct. 12, 1948 to C. M. Osterheld provided an off-peak heat storage system using electric heaters which resided in the use of an automatic thermostatic control system to energize the electric heater in conjunction with an additional input as to whether it was night or day. An electric heater was provided for heating a heat storage mass. A light-sensitive cell was provided which was subject to daylight and to darkness. A plurality of thermostats were provided in a close heat-receiving relation to the heat storage mass and were adapted to move to closed position at different temperature values of the heat storage. A plurality of time delay relays were provided which were electrically connected in series electric circuit with certain of the thermostats, each relay being a normally open thermally-actuable member and a heating coil therefor. A switch which was controlled by the light-sensitive cell was provided for energizing the heating cells of time-delay relays after fall of darkness to cause closure of the thermally-actuable member after a predetermined period of time, and energizaion of such heater.

U.S. Pat. No. 2,677,243 issued May 4, 1954 to M. Telkes purported to provide an apparatus for storing heat, utilizing the principle of the heat of fusion, and a process for releasing the heat thus stored. According to that patentee, a limited portion of the heat storage composition was either maintained at, or was occasionally subjected to, a temperature substantially lower than the melting point of the composition, and specifically below the temperature of metastable supersaturation of the composition. By this means seeding nuclei were maintained or formed in a limited portion of the mass of heat storage material, and when the same had been undercooled below its melting point in an effort to extract heat therefrom, crystal formation based upon such nuclei spread rapidly throughout the mass, thus allegedly releasing large quantities of latent heat.

U.S. Pat. No. 2,856,506 issued Oct. 14, 1958 to M. Telkes purported to provide a method of storing and releasing heat utilizing a heat storage material and a method of heating a substance which included transferring stored heat thereto from such a material. The patentee provided a system, including apparatus and method, for storing heat at a relatively high temperature by utilizing as the heat storage medium, a crystalline solid which is dimorphic, that is to say, which changes from one crystalline form to another on the application of heat, which has a transition temperature between 300° and 550° F., and which has a relatively high heat of transition. The material suggested was anhydrous sodium sulfate, either by itself or modified by the addition of other salts, which could be converted by heating from the rhombic crystal form to a hexagonal form.

U.S. Pat. No. 3,382,917 issued May 14, 1968 to R. F. Rice provided a heat storing system including a unit in which heat may be stored at widely-varying temperatures, a heat exchanger, a chamber for heating fluid or other heater, a conduit leading from the storage unit to the exchanger through which fluid may be circulated to transfer heat from the unit to the exchanger, a second conduit leading from the exchanger to the heater for transferring heat from the exchanger to the heat, regulating means in the first conduit for varying the rate of heat transfer from the unit to the exchanger, and thermostatic means in the second conduit for controlling the regulating means. The regulating means suggested was a circulator and flow modifier. The fluid may be either gas or liquid, the circulator may comprise a blower, pump or fan, and the flow modifier may comprise a by-pass or throttle.

U.S. Pat. No. 3,989,927 issued Nov. 2, 1976 to G. O. Erb provided a storage heater for heating a gaseous heat extraction medium which is formed of a container of heat resistant material, preferably metal. At least one guide duct, in the form of a tube for carrying the gaseous heat extraction medium, extended through the container which held a heat storage medium in the form of a pourable bulk of particulate solid material. The thermal storage medium comprised a bulk in which the product of specific heat of the solid material and the bulk density of the mass was a specified amount.

In spite of these patents, there is still a need for a system having a high heat storage capacity, one in which there is substantially no heat loss from the system when heating is not required, one which does not require added exchangers in direct connection to the heat storage unit, and one which requires a fairly low charging temperature.

One system for the utilization of solar energy for cooling is described in an article by D. I. Tchernev entitled "Solar Energy Application of Natural Zeolites" U.S. N.T.I.S. pp Rep. 1977 pp 266055, GRI 1977 77(14)156. The author describes a system using natural chabozite on clinoptilolite as the solid absorber and water vapour as the working fluid in a zeolite system to provide domestic hot water and space heating. One such system combines a condensor and an evaporator into a single unit that is cooled by an external water loop. During the day, water vapour desorbed from the solar-heated zeolite is condensed in this unit and the liquid water is stored in the condenser in a condensate storage tank until evening. The heat of condenstion may be used for providing domestic hot water and for space heating. Whenever there is a demand for heat, hot water can be circulated through a coil located in air ducts of a corced air system, and the heated air is distributed throughout the building.

SUMMARY OF THE INVENTION

Aims of the Invention

There have been two basic problems with the use of dessicants for storage systems even in the system described above. One is the disposal of the hot moist air produced during the drying out or charging cycle; the other is the requirement for moist air during the wetting or heating cycle.

Thus, one broad object of this invention is the provision of an improved dessicant heat storage system.

Another object of this invention is the provision of an improved method for dessicant heat storage.

Statement of the Invention

Applicant has provided an improved such system and method in which the problems described above are minimized. The present invention provides an improvement in a system based on gas adsorption for chemical potential storage of energy (CES). Such gas adsorption concept can provide the means for construction a "CES" system or "heat battery". The present invention uses a dessicant, e.g., zeolite, and a means of drying out or charging the system by the use e.g., of off-peak electric power. The heat is then released as required during periods of peak electric power by the re-introduction of moisture, in effect releasing the stored heat of varporization.

Thus, by this invention, a dessicant heat storage system is provided comprising (a) a source of air; (b) a fan means for circulating the air in a circulation system including an outgoing loop and return loop for the circulating air; (c) selectively operable evaporator heat exchanger means disposed in the outgoing loop of the circulating air; (d) selectively operable air wetting means disposed in the outgoing loop of the circulating air; (e) selectively operable air heating means disposed in the outgoing loop of the circulating air; (f) a dessicant-material-containing enclosure used to provide heat storage disposed in the circulation system, the enclosure consisting essentially of (i) a rectangular box; (ii) a bottom intake plenum; (iii) an upper outflow plenum; (iv) a plurality of hollow tubes, each comprising an outer mesh shell, an inner mesh shell, a free inner core and dessicant material filling the annular cylinder between the inner shell and the outer shell; (v) a tubular inlet collar projecting into the core of each such hollow tube, for feeding air from the bottom intake plenum to the hollow tubes; (vi) a tubular outlet tubular collar projecting into the core of each such hollow tube for feeding air from the hollow tubes to the upper outflow plenum; (vii) means for feeding air to the bottom intake plenum; (viii) means for withdrawing air from the upper outflow plenum; (ix) air inlet means to the bottom intake plenum from the outgoing loop of the circulating air; and (x) air outlet means from the upper outflow plenum to the return loop of the circulating air; whereby air entering the bottom intake plenum passes to the upper outflow plenum by a primary flow path out of contact with a major amount of the dessicant material directly through the free inner core of the hollow tube into which it is directly fed by an associated tubular inlet collar and by a secondary permeating flow path in contact with the dessicant material through at least one annular, cylindrical, dessicant-filled tube to a free core into which it had not been directly fed by an associated tubular collar; (g) selectively operable condenser heat exchanger means disposed in the return loop of the circulating air; and (h) selectively operable air control means disposed in the return loop of the circulating air, for selectively: (i) circulating the air through a primary heat distribution system; or (ii) recirculating the air through the circulating system.

By this invention, also, a dessicant heat storage system is provided in the form of a furnace adapted to store heat, comprising: (a) an air inlet; (b) an air outlet; (c) an airflow channel, connecting the air inlet to the air outlet; (d) a dessicant-containing enclosure used to provide heat storage, and including a bed of adsorbent energy storage dessicant material in the airflow channel, all airflow in the channel being directed through the bed, the dissicant-containing enclosure consisting essentially of (i) a rectangular box; (ii) a bottom intake plenum; (iii) an upper outflow plenum; (iv) a plurality of hollow tubes, each comprising an outer mesh shell, an inner mesh shell, a free inner core and dessicant material filling the annular cylinder between the inner shell and the outer shell; (v) a tubular inlet collar projecting into the core of each such hollow tube, for feeding air from the bottom intake plenum to the hollow tubes; (vi) a tubular outlet tubular collar projecting into the core of each such hollow tube for feeding air from the hollow tubes to the upper outflow plenum; (vii) means for feeding air to the bottom intake plenum; (viii) means for withdrawing air from the upper outflow plenum; (ix) air inlet means to the bottom intake plenum from the outgoing loop of the circulating air; and (x) air outlet means from the upper outflow plenum to the return loop of the circulating air; whereby air entering the bottom intake plenum passes to the upper outflow plenum by a primary flow path out of contact with a major amount of the dessicant material directly through the free inner core of the hollow tube into which it is directly fed by an associated tubular inlet collar and by a secondary permeating flow path in contact with the dessicant material through at least one annular, cylindrical, dessicant-filled tube to a free core into which it had not directly fed by an associated tubular collar; (e) air heating means, positioned upstream of the bed of adsorbent energy storage material; (f) air dehumidifying means, positioned downstream of the bed of adsorbent energy storage material; and (g) means to control the quantity of airflow through the airflow channel; whereby air from a building containing the furnace is humidified by the air humidifying means and/or by the ambient release of moisture in the building and is blown through the absorbent energy storage dessicant material, that material absorbing moisture in the air, thereby to dehumidify that air and releasing stored energy in the form of heat with the absorption of moisture.

By this invention, as well, a method is provided for dessicant heat storage comprising: (A) storing heat by the steps comprising: (a) drawing outside air and/or inside air into an internal air circulation system, (b) heating the outside air and/or passing heated inside air at a temperature of about 120°–200° C. through a bed of dessicant material, by passing the air to an upper outflow zone by a primary flow path out of contact with a major amount of the dessicant material directly through the free inner zone into which it is directly fed and by a secondary permeating flow path in contact with the dessicant material zone, to a free inner zone into which it had not been directly fed, thereby drying the dessicant bed, while storing heat in the dessicant bed and transferring moisture to the air, (c) withdrawing warm moist air at a temperature of up to about 200° C. from the dessicant bed, (d) passing the warm moist air through a condensation zone, whereby its moisture content is reduced, and (e) circulating the drier air within the internal air circulation system; and (B) recovering the stored heat by the steps comprising: (f) drawing internal air into the air circulation system, (g) converting the air to moist air, (h) passing the moist air through the dried bed of dessicant material, by passing the air to an upper outflow zone by a primary flow path out of contact with a major amount of the dessicant material directly through the free inner zone into which it is directly fed and by a secondary permeating flow path in contact with the dessicant material zone, to a free inner zone into which it has not been directly fed, thereby wetting the bed to a moisture content of about 5–20% by weight, while releasing heat from the bed to the air, and drying the air, and (i) circulating the warm dry air within the internal circulation system.

By this invention, as well, a method is provided for storing and retrieving heat from an airflow comprising the steps of: heating the airflow by means of an external energy source; directing the heated airflow through a bed of absorbent energy storage dessicant material by passing the air to a primary flow path out of contact with a major amount of the dessicant material directly through the free inner zone into which it is directly fed, and by a secondary permeating flow path in contact with the dessicant material through at least one annular cylindrical zone and to a free inner zone into which it has not been directly fed to remove moisture from the bed and to absorb heat therein; dehymidifying the airflow; disconnecting the external energy source; humidifying the air-flow; and directing the humidified airflow through the bed of absorbent energy storage dessicant material by passing the air to a primary flow path out of contact with a major amount of the dessicant material directly through the free inner zone into which it is directly fed, and by a secondary permeating flow path in contact with the dessicant material through at least one annular cylindrical zone and to a free inner zone into which it has not been directly fed, to add moisture to the bed and to receive heat therefrom.

Other Features of the Invention

By a feature of the heat storage system of this invention, the primary heat distribution system comprises a forced air furnace.

By another feature of the heat storage system of this invention, the primary heat distribution system is a retrofit system in combination with the forced air furnace.

By yet another feature of the heat storage system of this invention, the primary heat distribution system comprises a hot air/hot water heat exchanger.

By another feature of the heat storage system of this invention, the primary heat distribution system comprises a high velocity air duct.

By yet another feature of the heat storage system of this invention, the fan means is capable of pumping about 300–100 CFM.

By another feature of the heat storage system of this invention, the means (c) comprises the evaporator stage of a heat exchanger, where the air is passed in heat exchange relationship with warm moist air, thereby to heat that air while cooling the warm moist air.

By yet another feature of the heat storage system of this invention, the means (c) comprises a heat pump, where that air is passed in heat exchange relation through the evaporator stage of a heat pump, thereby to heat the air while cooling the warm moist air.

By another feature of the heat storage system of this invention, the means (d) comprises a humidifier.

By yet another feature of the heat storage system of this invention, the humidifier is a drum-type humidifier or a spray-type humidifier.

By another feature of the heat storage system of this invention, the air heating means comprises an electric resistance heater.

By yet another feature of the heat storage system of this invention, the electric resistance heater is of about 10–30 KW.

By another feature of the heat storage system of this invention, the air heating means comprises a heat pump.

By yet another feature of the heat storage system of this invention, the air heating means comprises a solar collector.

By another feature of the heat storage system of this invention, the air heating means comprises a solar/electric heater.

By another feature of the heat storage system of this invention, the dessicant material is a Zeolite.

By yet another feature of the heat storage system of this invention, the dessicant bed is constructed and configured to absorb about 5–20% of its own weight of water by the passage of moist air therethrough.

By another feature of the heat storage system of this invention, the means (g) comprises the condensor stage of a heat exchanger, where moist warm air is passed in heat exchange relation with cool air, thereby condensing out excess moisture from the air and simultaneously recovering heat of evaporation from the air by transferring heat to the cool air.

By yet another feature of the heat storage system of this invention, the means (g) comprises the condensor stage of a heat pump, where moist warm air is passed therethrough in heat exchange relation with cool air, thereby condensing out excess moisture from the air and simultaneously recovering heat of evaporation from the air by transferring heat to the cool air.

By another feature of the heat storage system of this invention, the system includes means associated with the condensor stage for recovering the moisture removed from the moist air.

By yet another feature of the heat storage system of this invention, the system includes means associated with the condensor stage for recovering the moisture removed from the moist air, and includes means for using recovered moisture in the air wetting means.

By another feature of the heat storage system of this invention, the system includes thermostat and associated control means for shutting off the air wetting means just prior to the sensing of the temperature reaching a predetermined value.

By yet another feature of the heat storage system of this invention, the means (h) includes air mixer means selectively actuatable for: (i) recirculating air through the dessicant heat storage system; and/or (ii) passing air to the primary heat distribution system.

By another feature of the heat storage system of this invention, the means (h) includes air mixer means selectively actuatable for: (i) circulating room air through the dessicant heat storage system; and/or (ii) passing air to the primary heat distribution system.

Thus, one embodiment of this invention for utilizing latent heat during the drying cycle is to warm cold outside air which could normally infiltrate a building. Cool air is pulled into the dessicant circuit through a heat exchanger which cools the air leaving the dessicant bed and removes moisture from the moist air. This, in turn, warms the cool air, which then may be distributed through the system. The effect is to pressurize the building to the extent that, for every cubic foot of air introduced through the dessicant system, an equal amount is prevented from entering through the building skin. The moisture removed by this method (possibly about 40 or 50 gallons) is retained for use during the wetting cycle of the heating cycle. During the wetting cycle, a cold water method of humidification would be used as the vaporization of the liquid during peak periods would require power equal to that used during the charging cycle and negate the cost effectiveness of the system. A standard commercial drum or spray type of humidifier would be used for the heating cycle.

A second embodiment of this invention is a system identical to the first with a modification in the drying cycle to allow the use of a heat pump to remove the moisture from the warm moist air and to re-introduce the heat generated by condensation to the supply side of the dessicant bed.

Which embodiment to be used would depend upon climate, type of residence, local regulations and customer acceptance. For example, some western Canadian provinces require minimum ventilating air be supplied to the residence at all times. This would make the first embodiment suitable.

The advantages over a conventional system are:

1. High heat storage capacity, in the neighbourhood of about 250 B.T.U. per pound of material.
2. Since only approximately 20% of the heat stored is sensible heat produced during the charging cycle there is no heat loss from the system when heating is not required. The importance of this advantage is significant particularly during the time of the year when maximum heating is not required, e.g., spring and fall. For example, a conventional system would release some heat even during a day when it was not required. This could result in overheating the space which is an energy loss. The present system stores heat indefinitely and will only release heat when it is required and moisture is added to the bed.
3. The dessicant is non-corrosive and allows the heating air to pass through it without the need for heat exchangers and resultant inefficiencies.
4. Relatively low charging temperatures (about 150° C.) compared to systems for the storage of sensible heat. The relatively small quantity of sensible heat produced during the charging cycle would be used for heating the residence during and immediately after the charging period.

BRIEF DESCRIPTION OF THE DRAWINGS

In the accompanying drawings.

DESCRIPTION OF PREFERRED EMBODIMENT

Figure 1:
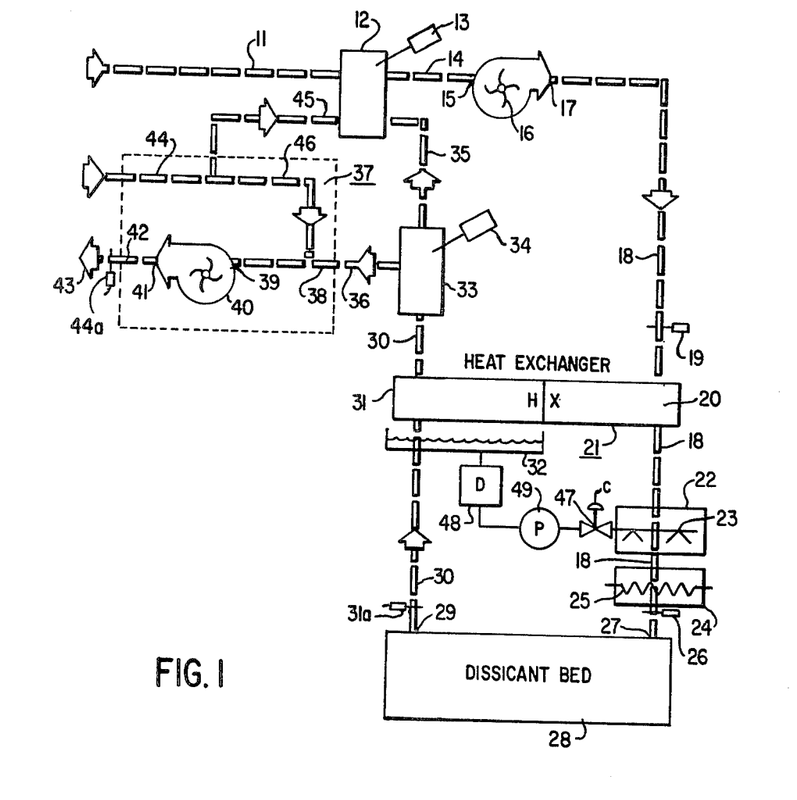
FIG. 1 is a schematic drawing of a dessicant heat storage system of one embodiment of this invention using ventilating air to utilize latent heat.

Description of FIG. 1

As seen in FIG. 1, a line 11 leads outside air through a mixing box 12 having controlled vanes to permit preselected air flows and including a heat sensor 13 operatively connected thereto. Another line 14 leads to the intake side 15 of fan 16 whose exhaust 17 is connected to line 18. Fan 16 is a positive displacement fan having a rating of 300–1000 CFM. Line 18 is provided with heat sensor 19 and passes through the evaporation side 20 of heat exchanger 21. Line 18 then passes through rewetting box 22 provided with means 23 to rewet air. These means may be a standard commercial drum-type or spray-type humidifier. Line 18 then passes through a heater box 24 provided with a means 25 to heat air. These means 25 are preferably a resistance heater rated at 10–30 KW. A third heat sensor 26 is provided in line 18 just before line 18 enters the intake 27 of the dessicant bed 28. A structure and configuration of one embodiment of dessicant bed will be described in greater detail hereinafter with reference to FIGS. 3 and 4.

The outlet 29 of the dessicant bed 28 leads to line 30, and is provided, near outlet 29, with a fourth heat sensor 31. Line 30 leads to the condensation side 31 of heat exchanger 21. Any moisture in the air which condenses out is collected in tray 32, to be reused as will be described hereinafter. Then, line 30 leads to a mixing box 33 provided with controlled plates to permit selected air flow. Mixing box 33 is provided with a fifth heat sensor 34.

Two lines branch off from mixing box 32. One line, 35 leads to mixing box 12 where vanes therein can recirculate the air through the system via fan 17 and line 8. A second line, 36, is controlled by vanes to lead to furnace 37. Furnace 37 is provided with a flow line 38 connecting line 36 with the intake 39 of furnace fan 40. The furnace fan 40 may include a positiv displacement fan rated at about 1000 CFM. The outlet 41 from the furnace fan 40 is discharged at 42 to the hot air discharge duct 43. A fifth heat sensor 44 may be placed in the discharge duct 43.

The furnace 37 is also provided with room air return line 44, which bifurcates to an outgoing line 45 which leads to mixing box 12, and with recycle line 46 leading back to line 38.

Figure 2:
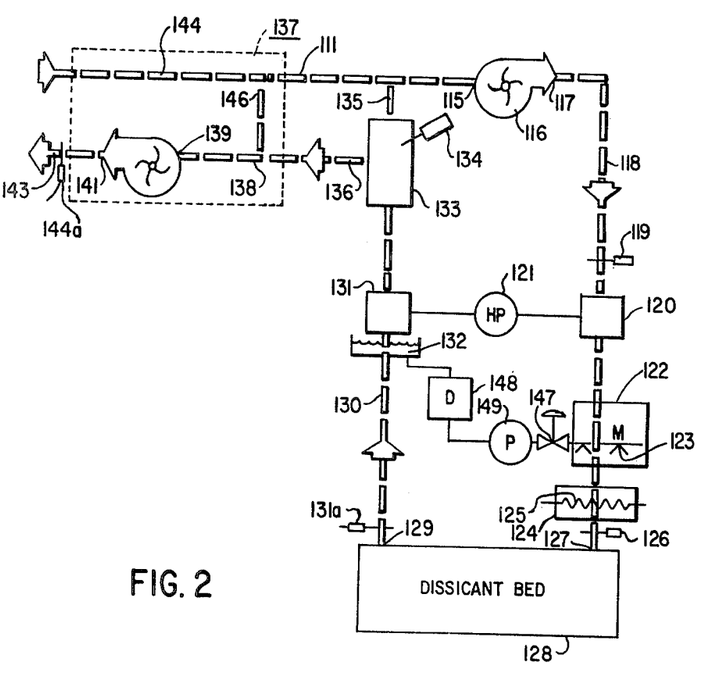
FIG. 2 is a schematic drawing of a dessicant heat storage system of another embodiment of this invention using a heat pump to utilize latent heat.

Description of FIG. 2

Now referring to FIG. 2, room air is connected via furnace intake line 144 to furnace 137 and then to the intake side 115 of fan 116. The exhaust side 117 of fan 116 leads via line 118 to the evaporator side 120 of a heat pump 121. The line 118 is provided with a heat sensor 119. Line 118 leads through a regetting box 122 having a rewetter 123 as previously described for FIG. 1. Then line 118 leads through heater box 124 containing a heater 125 as described for FIG. 1. A heat sensor 126 is provided in line 118 before it enters inlet 127 of dessicant bed 126 is provided in line 118 before it enters inlet 127 of dessicant bed 128. The outlet 129 from dessicant bed 128 leads to outlet line 119 past heat sensor 131 and through the condenser side 131 of the heat pump 121, the condenser side 131 also including a condensation tray 132. The outlet line 130 from condenser side 131 passes through mixing box 133. Mixing box 133 is provided with a heat sensor 134. Two lines lead from mixing box 132, one to line 135 to line 111 for recycling through the system and the second line 136 to furnace line 138 to the inlet side 139 of furnace fan 140. Furnace fan 140 expels heated air through exhaust side 141 to hot air outlet 143. Hot air outlet 143 is provided with a heat sensor 144.

Figure 3:
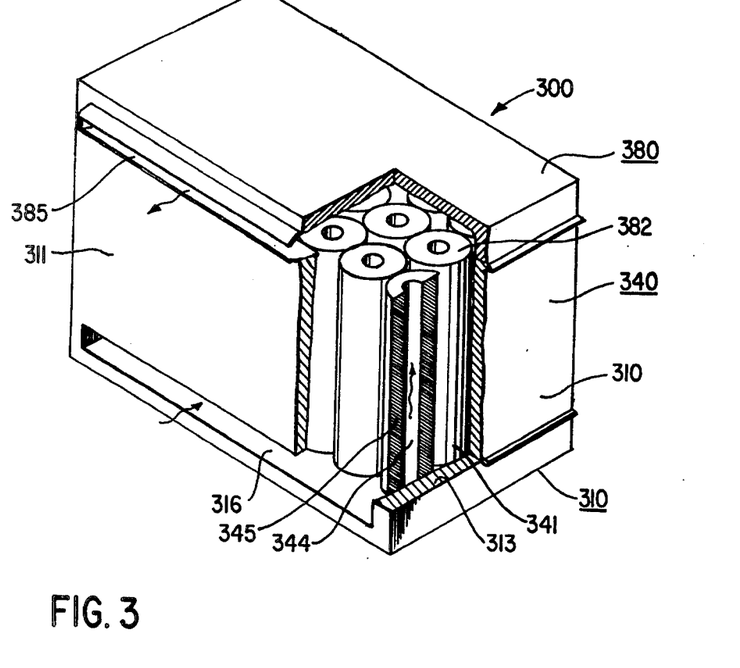
FIG. 3 is an isometric view, partially broken away, of an energy storage container used in a system of an embodiment of this invention.
Figure 4:
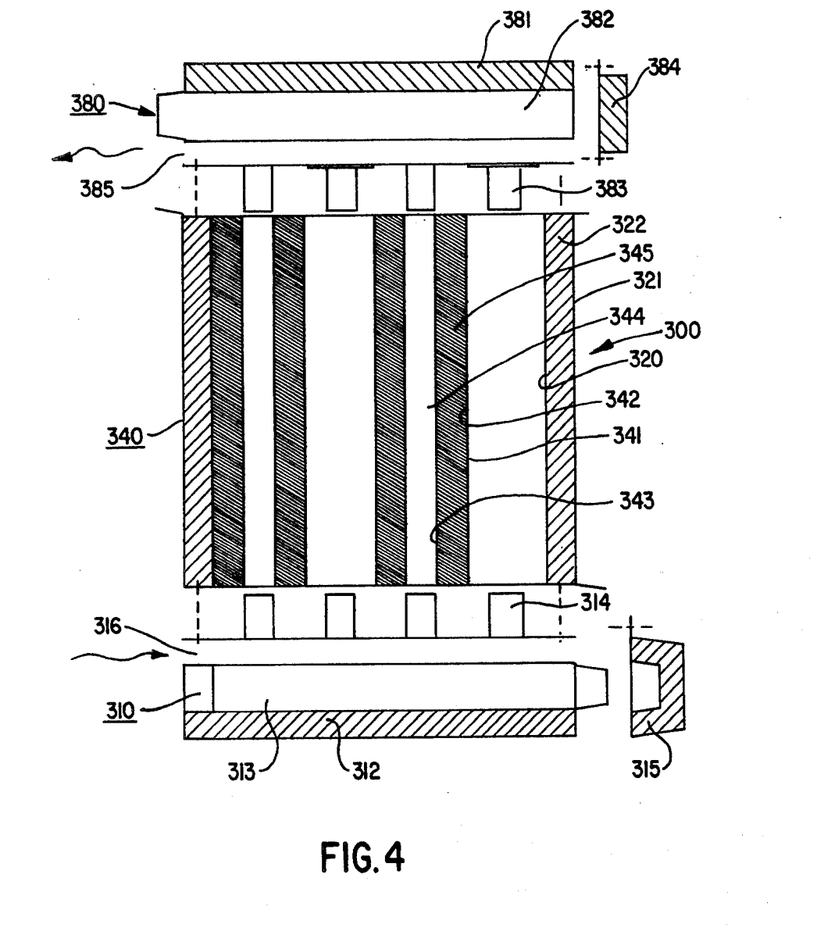
FIG. 4 is a vertical section, in disassembled form, of the energy storage container of FIG. 3.

Description of FIGS. 3 and 4

FIGS. 3 and 4 show a typical dessicant heat storage container 300. The container includes a bottom section 310, a core section 340 and a top section 380, all contained within a rectangular parallelepiped hollow box 311. The core section 340 is packed with a plurality of hollow cylinders 341, each comprising an outer shell 342 and an inner shell 343, defining a core 344, and preferably made from square mesh woven wire cloth having 7 meshes per lineal inch of stainless steel wire and having 38.8% open area. The shell walls are reinforced at their mid-length and are then filled with the dessicant material 345, e.g. zeolite.

The bottom section 310 comprises a base 312 supporting a bottom intake plenum 313. The plenum 313 is provided with a plurality of inlet tubular collars 314, the number of such collars 314 being equal to the number of hollow cylinders 341. The collars 314 project into the core 344 of the hollow cylinders 341. The plenum 313 is sealed with a bottom cap 315. The plenum 313 is fed by an inlet throat 316.

Similarly, the top section 380 includes a roof 381 with a depending upper outflow plenum 382 therein. The plenum 382 is provided with a similar plurality of outlet tubular collars 383, the number of such tubular collars being equal to the number of the hollow cylinders 341. The collars 383 are fed from the core 341 of the respective hollow cylinder 341. The upper plenum 382 is sealed with a cap 384. The upper outflow plenum 382 discharges through an outlet vent 385.

The hollow box 311 comprises an inner wall 320, and outer wall 321, preferably formed of glass fiber reinforced plastics, with fire retardant high density insulation core 322 therebetween.

The collars, upper and lower plates, inlet and outlet caps, and upper roof and support plates are all preferably made from glass fiber reinforced plastic. The components are preferably assembled with non-corroding removable fasteners. All joints are preferably made air tight with high temperature gaskets.

The flow of air through the dessicant heat storage container 300 is through the bottom intake plenum 313 and into the hollow cylinders 341 to the inlet tubular collars 314, and out through the outlet tubular collars 383 to the upper outflow plenum 382. There is a primary direct flow unencumbered through the hollow core 344 while avoiding contact with most of the dessicant material 345, and a secondary permeating flow through the dessicant material 345.

OPERATION OF PREFERRED EMBODIMENTS

Operation of the Embodiment of FIG. 1

In operation of the system of FIG. 1, for the charging or drying cycle, system circulation of a mix of outside air and room air by means of fan 16 drives air flowing at a rate e.g. of about 300–1000 CFM through the evaporator side 20 of the heat exchanger 21, and then through the heating box 24 where the temperature is raised up to a maximum of 200° C., preferably to about 150° C. This air at such temperature then passed through the dessicant bed 28 containing a suitable dessicent (e.g., a zeolite, e.g. Zeolite 13A, Zeosorb 3.5A, Zeosorb 5.0A, chabozite, clinoptolite, erionite or mordenite) drying the dessicant and emerging as warm moist air at a temperature of up to about 200° C. The warm moist air then passes through the condensor side 31 of heat exchanger 21 where moisture is removed and the water then stored in container 32. The air, now at temperature of ambient up to about 100° to about 150° C. then is passed through mixing box 33. If the air is to be recycled, it then passes into mixing box 12 where it is mixed with outside air (via line 11) and return air (via line 45) to lower its temperature. Such low temperature air is then recycled by being forced by fan 16 through the heat exchanger 21 to continue the cycle.

If the air is to be passed through the existing furnace 37, it passes from mixing box to line 36 to the furnace 37.

It is to be observed that only maximum temperatures have been given. The temperature of the air depends on the humidity thereof at various stages within the cycle and also on the particular instantaneous stage of the cycle, i.e. whether it is near the beginning or the end of the cycle.

The collars, upper and lower plates, inlet and outlet caps, and upper roof and support plates are all preferably made from glass fiber reinforced plastic. The components are preferably assembled with non-corroding removable fastners. All joints are preferably made air tight with high temperature gaskets.

The principle involved in this embodiment of this invention is that the mix of outside air and return air provides a sufficient temperature difference across the heat exchanger to remove moisture from the hot discharge air from the dessicant bed. The second mixing box permits the furnace fan to draw heat from the system when heating is required. The system is designed to provide heat for the building during off-peak periods and to store the heat during other periods.

The state of charge of the dessicant in the dessicant bed 28 is determined by temperature sensors 26, 31, located at the intake and discharge sides respectively of the dessicant bed 28. This operates on the principle that, as the dessicant bed dries, the temperature of the discharged air rises until it almost equals the temperature of the intake air.

In the discharge or heating cycle, on a call for heat, both the circulation fan 16 and furnace fan 40 start up. The vane within mixing box 12 is closed to shut off the supply of outsides air from line 11 during the heating cycle. The air is circulated by fan 16 through the rewetting box 22 where its moisture is brought up to about 30%–90% and then through the dessicant bed 28 where the dessicant therein absorbs about 5-20% of its weight of water, thereby simultaneously drying the air and heating the air. The warm air at a temperature up to about 200° C. emerging from the dessicant bed 28 passes in non-heat exchange relationship through heat exchanger 21 and then is drawn off through mixing box 33 by furnace fan 40. The air is circulated through the building and is returned through lines 44 and 45 to mixing box 12 and to fan 16 to continue the cycle. The temperature of the air is controlled by the amount of moisture delivered to the air by a pump 46 and a control valve 47 leading from container 32. To prevent overheating and sensible heat loss from the dessicant bed 28, a thermostat and data processor 48 is provided to anticipate the heating requirement and to turn off the wetting system prior to the building reaching the desired temperature. At this time, even though the air is not being wetted, it is still passed through the dessicant bed 28. Now the air picks up the residual sensible heat remaining in the dessicant bed 28 for use in heating the building. The dessicant bed 28 therefore is warm only when heat is required, except during the period immediately after charging. During that period, sensible heat would be drawn from the dessicant bed 28 as required until the dessicant bed 28 cooled.

Operation of the Embodiment of FIG. 2

In use of the system of FIG. 2, the circulation is the same as that for the ventilating air system described with reference to FIG. 1 with the exception that there is no outside air required to cool a heat exchanger and to remove the moisture from the dessicant bed 128. This function is accomplished by the use of the heat pump 121 with its evaporator section 120 in the outgoing side and its condensor section 131 in the return side of the circuit. The heat for drying the dessicant bed in this embodiment of the invention is largely supplied by the heat pump 121 with the resistance heater 125 acting as a booster.

The discharge or heating cycle in this embodiment is identical to that described hereinbefore for FIG. 1, since the heat pump 121 does not operate during this cycle. Consequently, no further description will be given at this time.

SUMMARY

While the example herein describes the invention as a retrofit to a forced air furnace, it may be used as a new system including a forced air system. Other primary heat distribution systems may also be used. For example, a hot water heating system including a hot air/water heat exchange system may be used, either as a new system or as a retrofit system. Another type of primary heat distribution system is the so-called high velocity duct system.

The system used to take advantage of latent heat recovery may be a heat exchanger or a heat pump. As noted before, where an air "leakage" system is selected, a heat exchanger would be used. Any other equivalent type of evporator/condenser heat transfer system could also be used.

The system is designed primarily to use the off-peak electric power to heat the air to dry the dessicant bed. However, a heat pump may be used. Also any convenient source of heat may be used, e.g. from engines etc. Also, solar collectors or solar/electric heaters may be used.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:
1. A dessicant heat storage system comprising:
 (a) a source of air;
 (b) a fan means for circulating said air in a circulation system including an outgoing loop and a return loop for circulating air;
 (c) selectively operable evaporator heat exchanger means disposed in the outgoing loop of said circulating air;
 (d) selectively operable air wetting means disposed in the outgoing loop of said circulating air;
 (e) selectively operable air heating means disposed in the outgoing loop of said circulating air;
 (f) a dessicant-material-containing enclosure used to provide heat storage disposed in said circulation system, said enclosure consisting essentially of (i) a rectangular box; (ii) a bottom intake plenum; (iii) an upper outflow plenum; (iv) a plurality of hollow tubes, each comprising an outer mesh shell, an inner mesh shell, a free inner core and dessicant material filling the annular cylinder between the inner shell and the outer shell; (v) a tubular inlet collar projecting into the core of each said hollow tube, for feeding air from said bottom intake plenum to said hollow tubes; (vi) a tubular outlet tubular collar projecting into the core of each said hollow tube for feeding air from said hollow tubes to said upper outflow plenum; (vii) means for feeding air to said bottom intake plenum; (viii) means for withdrawing air from said upper outflow plenum; (ix) air inlet means to said bottom intake plenum from the outgoing loop of said circulating air; and (x) air outlet means from said upper outflow plenum to the return loop of said circulating air; whereby air entering said bottom intake plenum passes to said upper outflow plenum by a primary flow path out of contact with a major amount of said dessicant material directly through the free inner core of the hollow tube into which it is directly fed by an associated tubular inlet collar and by a secondary permeating flow path in contact with said dessicant material through at least one annular, cylindrical, dessicant-filled tube to a free core into which it had not been directly fed by an associated tubular collar;
 (g) selectively operable condenser heat exchanger means disposed in the return loop of said circulating air; and
 (h) selectively operable air control means disposed in the return loop of said circulating air, for selectively: (i) circulating said air through a primary heat distribution system; or (ii) recirculating said air through said circulating system.
2. The system of claim 1 wherein said primary heat distribution system comprises a forced air furnace.
3. The system of claim 1 wherein said primary heat distribution system is a retrofit system in combination with a forced air furnace.

4. The system of claim 1 wherein said primary heat distribution system comprises a hot air/hot water heat exchanger.

5. The system of claim 1 wherein said primary heat distribution system comprises a high velocity air duct.

6. The system of claim 1 wherein said fan means is capable of pumping about 300–1000 CFM.

7. The system of claim 1 wherein said means (c) comprises the evaporator stage of a heat exchanger, where said air is passed in heat exchange relationship with warm moist air, thereby to heat said air while cooling said warm moist air.

8. The system of claim 1 wherein said means (c) comprises a heat pump, where said air is passed in heat exchange relation through the evaporator state of a heat pump, thereby to heat said air while cooling said warm moist air.

9. The system of claim 1 wherein said means (d) comprises a humidifier.

10. The system of claim 9 wherein said humidifier is a drum-type humidifier or a spray-type humidifier.

11. The system of claim 1 wherein said air heating means comprises an electric resistance heater.

12. The system of claim 11 wherein said electric resistance heater is of 10–30 KW.

13. The system of claim 1 wherein said air heating means comprises a heat pump.

14. The system of claim 1 wherein said air heating means comprises a solar collector.

15. The system of claim 1 wherein said air heating means comprises a solar/electric heater.

16. The system of claim 1 wherein said dessicant material is a Zeolite.

17. The system of claim 1 wherein, said bed is constructed and configured to absorb about 5–20% of its own weight of water by the passage of moist air therethrough.

18. The system of claim 1 wherein said means (g) comprises the condensor stage of a heat exchanger, where moist warm air is passed in heat exchange relation with cool air, thereby condensing out excess moisture from said air and simultaneously recovering heat of evaporation from said air by transferring heat to said cool air.

19. The system of claim 1 wherein said means (g) comprises the condensor stage of a heat pump, where moist warm air is passed therethrough in heat exchange relation with cool air thereby condensing out excess moisture from said air and simultaneously recovering heat of evaporation from said air by transferring heat to said cool air.

20. The system of claim 18 including means associated with said condensor stage for recovering the moisture removed from the moist air.

21. The system of claim 19 including means associated with said condensor stage for recovering the moisture removed from the moist air.

22. The system of claim 18 including means associated with said condensor stage for recovering the moisture removed from the moist air, and including means for using recovered moisture in said air wetting means.

23. The system of claim 19 including means associated with said condenser stage for recovering the moisture removed from the moist air, and including means for using recovered moisture in said air wetting means.

24. The system of claim 1 including thermostat and associated control means for shutting off the air wetting means just prior to the sensing of the temperature reaching a predetermined value.

25. The system of claim 1 wherein said means (h) includes air mixer means selectively actuatable for:
(i) recirculating air through said dessicant heat storage system; and/or
(ii) passing air to said primary heat distribution system.

26. The system of claim 1 wherein said means (h) includes air mixer means selectively actuatable for:
(i) circulating room air through said dessicant heat storage system; and/or
(ii) passing air to said primary heat distribution system.

27. A method for dessicant heat storage comprising:
(A) storing heat by the steps comprising:
(a) drawing outside air and/or inside air into an internal air circulation system,
(b) heating said outside air and/or passing heated inside air at a temperature of 120°–300° C. through a bed of dessicant material, by passing said air to an upper outflow zone by a primary flow path out of contact with a major amount of said dessicant material directly through the free inner zone into which it is directly fed, and by a secondary permeating flow path in contact with said dessicant material zone, to a free inner zone into which it had not been directly fed, thereby drying said dessicant bed, while storing heat in said dessicant bed and transferring moisture to said air,
(c) withdrawing warm moist air at a temperature of up to 200° C. from said dessicant bed,
(d) passing said warm moist air through a condensation zone, whereby its moisture content is reduced, and
(e) circulating said drier air within said internal air circulation system; and
(B) recovering said stored heat by the steps comprising:
(f) drawing internal air into the air circulation system,
(g) converting said air to moist air,
(h) passing said moist air through said dried bed of dessicant material, by passing said air to an upper outflow zone by a primary flow path out of contact with a major amount of said dessicant material directly through the free inner zone into which it is directly fed, and by a secondary permeating flow path in contact with said dessicant material, through at least one annular, cylindrical zone, and to a free inner zone into which it had not been directly fed, thereby wetting said bed to a moisture content of about 5–20% by weight while releasing heat from the bed to said air, and drying said air, and
(i) circulating said warm dry air within said internal circulation system.

28. A dessicant heat storage system in the form of a furnace adapted to store heat, comprising:
(a) an air inlet;
(b) an air outlet;
(c) an airflow channel, connecting the air inlet to the air outlet;
(d) a dessicant-containing enclosure used to provide heat storage, and including a bed of adsorbent energy storage dessicant material in the airflow channel, all airflow in the channel being directed through the bed, the dessicant-containing enclosure consisting essentially of (i) a rectangular box; (ii) a bottom intake plenum; (iii) an upper outflow plenum; (iv) a plurality of hollow tubes, each comprising an outer mesh shell, an inner mesh shell, a free inner core and dessicant material filling the annular cylinder between the inner shell and the outer shell (v) a tubular inlet collar projecting into the core of each said hollow tube, for feeding air from said bottom intake plenum to said hollow tubes; (vi) a tubular outlet tubular collar projecting into the core of each said hollow tube for feeding air from said hollow tubes to said upper outflow plenum; (vii) means for feeding air to said bottom intake plenum; (viii) means for withdrawing air from said upper outflow plenum; (ix) air inlet means to said bottom intake plenum from the outgoing loop of said circulating air; and (x) air outlet means from said upper outflow plenum to the return loop of said circulating air; whereby air entering said bottom intake plenum passes to said upper outflow plenum by a primary flow path out of contact with a major amount of said dessicant material directly through the free inner core of the hollow tube into which it is directly fed by an associated tubular inlet collar and by a secondary permeating flow path in contact with said dessicant material through the at least one annular, cylindrical, dessicant-filled tube to a free core into which it had not been directly fed by an associated tubular collar;

(e) air heating means, positioned upstream of the bed of adsorbent energy storage material;

(f) air dehumidifying means, positioned downstream of the bed of adsorbent energy storage material; and (g) means to control the quanity of airflow through the airflow channel;

whereby air from a building containing the furnace is humidified by the air humidifying means and/or by the ambient release of moisture in the building and is blown through said absorbent energy storage dessicant material, said material absorbing the moisture in the air thereby to dehumidify that air and releasing stored energy in the form of heat with the absorption of the moisture.

29. The system of claim 1 wherein said means (g) comprises the condensor stage of a heat exchanger, where moist warm air is passed in heat exchange relation with cool air, thereby condensing out excess moisture from said air and simultaneously recovering heat of evaporation from said air by transferring heat to said cool air; and including means associated with said condensor stage for recovering moisture removed from said moist air; and including means for using recovered moisture in said air wetting means.

30. The system of claim 1 wherein said means (g) comprises the condensor stage of a heat pump, where moist warm air is passed through in heat exchange relation with cool air thereby condensing out excess moisture from said air and simultaneously recovering heat of evaporation from said air by transferring heat to said cool air; including means associated with said condensor stage for recovering moisture removed from said moist air; and including means for using recovered moisture in said air wetting means.

31. A method for storing and retrieving heat from an airflow comprising the steps of:

heating the airflow by means of an external energy source;

directing the heated airflow through a bed of absorbent energy storage dessicant material by passing said air to a primary flow path out of contact with a major amount of said dessicant material directly through the free inner zone into which it is directly fed, and by a secondary permeating flow path in contact with said dessicant material through at least one annular cylindrical zone and to a free inner zone into which it had not been directly fed to remove moisture from the bed and to absorb heat therein;

dehumidifying the airflow;

disconnecting the external energy source;

humdifying the airflow; and directing the humidified airflow through the bed of adsorbent energy storage dessicant material by passing said air to a primary flow path out of contact with a major amount of said dessicant material directly through the free inner zone into which it is directly fed, and by a secondary permeating flow path in contact with said dessicant material through at least one annular cylindrical zone and to a free inner zone into which it had not been directly fed, to add moisture to the bed and to receive heat therefrom.

32. A method as claimed in claim 27 in which said bed of dessicant material is Zeolite.

33. A method as claimed in claim 31 in which said bed of dessicant material is Zeolite.

* * * * *